United States Patent [19]
Nemcek et al.

[11] 3,974,053
[45] Aug. 10, 1976

[54] METHOD OF POLYMERIZING ETHYLENICALLY UNSATURATED MATERIALS BY IRRADIATION AND COMPOSITION FOR USE THEREIN

[75] Inventors: Josef Nemcek; Nicholas Heap, both of Runcorn, England

[73] Assignee: Imperial Chemical Industries Limited, London, England

[22] Filed: Nov. 19, 1974

[21] Appl. No.: 525,275

[30] Foreign Application Priority Data
Nov. 19, 1973 United Kingdom............... 53581/73

[52] U.S. Cl. .................. 204/159.15; 96/115 P; 204/159.18; 204/159.23; 204/159.24; 260/77.5 CR; 260/859 R; 260/861; 260/864; 260/865; 260/872; 526/260; 526/312; 526/321; 526/328; 526/330; 526/341; 260/47 UA; 526/346
[51] Int. Cl.² .................. C08F 8/00; C08F 2/46
[58] Field of Search.................. 204/159.18, 159.23, 204/159.24; 96/115 P

[56] References Cited
UNITED STATES PATENTS

| | | | |
|---|---|---|---|
| 3,625,744 | 12/1971 | Juna et al. ...................... | 117/93.31 |
| 3,637,382 | 1/1972 | Krauch ...................... | 96/35.1 |
| 3,682,642 | 8/1972 | Loridon et al. .................. | 96/115 R |
| 3,726,677 | 4/1973 | Hepher et al............................ | 96/33 |

*Primary Examiner*—Richard B. Turer
*Attorney, Agent, or Firm*—Cushman, Darby & Cushman

[57] ABSTRACT

Photopolymerizable compositions consisting essentially of at least one polymerizable ethylenically unsaturated material and a photosensitive catalyst comprising a. from 0.5% to 5% by weight based on the ethylenically unsaturated material of at least one photosensitizer having the structure

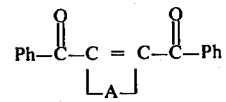

wherein Ph is phenyl, halogen-substituted phenyl, phenylene or halogen-substituted phenylene and A is a cyclic hydrocarbyl group, a halogen-substituted cyclic hydrocarbyl group or a group of the formula

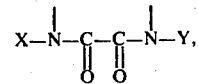

where X and Y each is hydrogen, a hydrocarbyl or a halogen-substituted hydrocarbyl group, and b. from 1 to 5% by weight based on the ethylenically unsaturated material of a reducing agent capable of reducing the photosensitizer when the photosensitizer is in an excited state.

Also described is a process of preparing polymeric materials by irradiating the foregoing polymerizable composition at a wavelength capable of exciting the photosensitizer to an excited state.

18 Claims, No Drawings

METHOD OF POLYMERIZING ETHYLENICALLY UNSATURATED MATERIALS BY IRRADIATION AND COMPOSITION FOR USE THEREIN

This invention relates to a photopolymerizable composition comprising an ethylenically unsaturated polymerizable material and a photosensitive catalyst, and to a process for the production of polymeric materials from said composition.

It is known to polymerize an ethylenically unsaturated polymerizable material by irradiating the material with visible or ultraviolet radiation in the presence of a photosensitizer which is capable of absorbing the radiation and initiating polymerization of the unsaturated material.

It has also been proposed to polymerize an ethylenically unsaturated polymerizable material by irradiating the material in the presence of a photosensitive dye, e.g., rose bengal, and a reducing agent which is capable of reducing the photosensitive dye when the dye is in an excited state. The photosensitive dyes are in general highly colored and photopolymerizable compositions containing such dyes are generally very sensitive to the presence of oxygen, that is, in the presence of oxygen the rate of polymerization of the composition when irradiated with radiation of a wavelength which is absorbed by the dye is generally considerably reduced when compared with the rate of polymerization of the composition in the absence of oxygen.

We have found novel combinations of certain photosensitizers and reducing agents which, with polymerizable ethylenically unsaturated material, form the photopolymerizable compositions of the present invention. The compositions containing the novel combinations of photosensitizer and reducing agent are in general polymerizable at a greater rate, and often at a considerably greater rate, than are compositions which contain photosensitizers but which do not contain a reducing agent.

The compositions of our invention are stable in the dark such that little if any polymerization takes place after the composition has been standing for weeks or even months in the dark. Polymerization of the ethylenically unsaturated material is initiated only under the influence of radiation of a suitable wavelength.

Accordingly, the present invention provides a photopolymerizable composition comprising at least one polymerizable ethylenically unsaturated material and a photosensitive catalyst comprising a. at least one photosensitizer having the structure

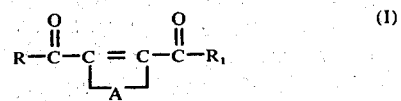

where R and $R_1$ may be the same or different and each is a hydrocarbyl or a substituted hydrocarbyl group and A is a hydrocarbyl or a substituted hydrocarbyl group or a group of formula

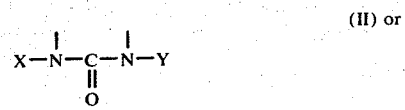

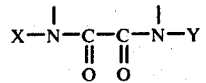

where X and Y may be the same or different and each is hydrogen, a hydrocarbyl group or a substituted hydrocarbyl group (preferably X is R and Y is $R_1$), and b. at least one reducing agent capable of reducing the photosensitizer when the photosensitizer is in an excited state.

According to a further embodiment of the invention there is provided a process for the preparation of a polymeric material which comprises irradiating a photopolymerizable composition as described in the immediately preceding paragraph with radiation having a wavelength which is capable of being absorbed by the photosensitizer so as to convert the photosensitizer to an excited state.

The radiation may be visible light or ultraviolet radiation or radiation which includes within its spectrum radiation of both visible and ultraviolet wavelengths. Suitably, the radiation may have a wavelength in the range 230 m$\mu$ to 600 m$\mu$. Sunlight may be used as the source of radiation although the wavelength of radiation to be used will be determined by the particular photosensitizer in the composition, the radiation being of a wavelength such as to be absorbed by the photosensitizer so as to convert the photosensitizer to an excited state. The optimum wavelength for a particular photosensitizer may be chosen by means of simple experiment, for example by measuring the electronic absorption spectrum of the photosensitizer.

The groups R and $R_1$ in the photosensitizer may be aliphatic or aromatic groups. It is to be understood that the groups R and $R_1$ may be the same or different. For example, in the photosensitizer of structure I both of the groups R and $R_1$ may be aromatic, or both may be aliphatic, or one group may be aromatic and the other aliphatic. However, for reasons of convenience in preparing the photosensitizer, the groups R and $R_1$ are usually the same.

Within the scope of the term aliphatic groups we include cycloaliphatic groups and aliphatic groups carrying aromatic substituents, that is alkaryl groups. Similarly, within the scope of the term aromatic group we include groups carrying alkyl substituents, that is aralkyl groups.

The aromatic group may be a benzenoid aromatic group, e.g., the phenyl group, or it may be a non-benzenoid cyclic group which is recognized in the art as possessing the characteristics of a benzenoid aromatic group.

The groups R and $R_1$, especially when these are aromatic may carry substituents other than hydrocarbyl groups, for example halogen atoms or alkoxy groups, provided the photosensitizer containing the substituents is not present in the photopolymerizable composition in such a concentration as to result in substantial inhibition of polymerization of the ethylenically unsaturated material.

In the photosensitizer having the structure I, the group A preferably has the structure II or III and in particular preferably has the structure III wherein X is R and Y is $R_1$, that is the structure

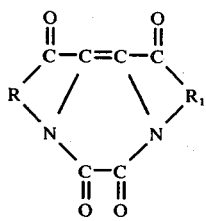

A hereinbefore described the groups R and $R_1$ may be aliphatic or aromatic groups and a particularly useful photosensitizer is the compound of structure IV wherein R and $R_1$ both are the phenyl group, especially the compound wherein R and $R_1$ both are

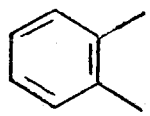

i.e., N,N'-oxalyl indigo. We have found that N,N'-oxalyl indigo is an efficient photosensitizer when subjected to visible or ultraviolet radiation whereas the majority of N,N'-disubstituted indigo derivatives are inactive.

The groups R and $R_1$ together may form a fused aromatic ring system.

The concentration of the photosensitizer in the photopolymerizable composition is not critical. By way of example concentrations in the range 0.001 to 10% are usually satisfactory, although concentrations outside this range may be used if desired. Normally the photosensitizer will be present in a concentration of from 0.1 to 7%, and preferably from 0.5 to 5%, by weight of the polymerizable ethylenically unsaturated material in composition.

The reducing agent present in the photopolymerizable composition should have a reduction potential such that it is capable of reducing the photosensitizer when the latter is in an excited state but is incapable of reducing the photosensitizer when the latter is not in an excited state. Furthermore, it is desirable that the reducing agent, when oxidized by the excited photosensitizer, is capable of initiating polymerization of the polymerizable ethylenically unsaturated material. The reducing agent, at the concentration at which it is present in the photopolymerizable composition, should have little or no inhibiting effect on polymerization of the unsaturated material. Whether or not a reducing agent has an inhibiting effect may be determined by means of simple experiment, for example by effecting polymerization of the ethylenically unsaturated material by means of a thermal initiator in the presence of, and in the absence of, a reducing agent in the desired concentration and comparing the rates of polymerization observed.

Reducing agents which may be used include compounds having the structure

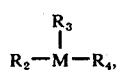

where M is an element of Group Vb of the Periodic Table of the Elements and the units R, which may be the same or different, are hydrogen atoms, hydrocarbyl groups, substituted hydrocarbyl groups or groups in which two units R together with the element M form a cyclic ring system, no more than two of the units R being hydrogen atoms, and where the element M is attached directly to an aromatic group R, at least one of the groups R has a

group attached to M.

The Periodic Table of the Elements referred to is that published in "Advanced Inorganic Chemistry," second edition, by F. A. Cotton and G. Wilkinson (Interscience 1966).

Preferably, the reducing agent having the structure

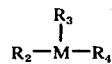

is free of aromatic groups attached directly to the element M.

The element M in the reducing agent may be, for example, phosphorous, arsenic, antimony or, preferably, nitrogen.

The reducing agent may be primary, secondary or tertiary, that is in the structure

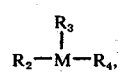

two, one or none of the units R may be hydrogen atoms. For example the reducing agent may be a primary, secondary or tertiary amine or phosphine.

One or more of the groups $R_2$, $R_3$ and $R_4$ may be a hydrocarbyl group, for example an alkyl, cycloalkyl or alkaryl group. Preferably at least one is an alkyl group which may, for example, contain from 1 to 10 carbon atoms.

Examples of suitable reducing agents in which one or more of the groups $R_2$, $R_3$ and $R_4$ is a hydrocarbyl group include propylamine, n-butylamine, pentylamine, hexylamine, dimethylamine, diethylamine, dipropylamine, di-n-butylamine, dipentylamine, trimethylamine, triethylamine, tripropylamine, tri-n-butylamine, tripentylamine, dimethylaminoethyl methacrylate, and long chain fatty amines, e.g., $C_{18}H_{37}NMe_2$. Examples of reducing agents containing aromatic groups include N,N'-dimethylaniline and N-methyl diphenylamine.

It is to be understood that throughout this specification where we refer to specific examples of suitable reducing agents in which the element M is nitrogen we also include corresponding specific examples in which the element M is phosphorous, arsenic or antimony.

One or more of the units R may be a substituted hydrocarbyl group and in particular the hydrocarbyl group may carry a substitutent having the structure -continued

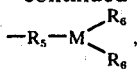

where M is an element of Group Vb of the Periodic Table of the Elements and the unit $R_5$ is, for example, an alkylene chain and the units $R_6$, which may be the same or different, are for example, hydrogen atoms or hydrocarbyl groups.

Reducing agents having the structure

in which at least one of the units R is a substituted hydrocarbyl group include dialkylaminoalkanols, for example, dimethylaminoethanol, and diamines of the structure

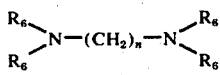

in which $n$ is a whole number of at least two and the groups $R_6$, which may be the same or different, are hydrogen atoms or hydrocarbyl and especially alkyl, groups. For example, the reducing agent may be ethylene diamine, trimethylene diamine, tetramethylene diamine, pentamethylene diamine or hexamethylene diamine, or N-hydrocarbyl, especially N-alkyl derivatives thereof. Other suitable reducing agents include derivatives having the structure

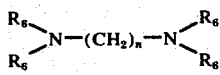

in which one or more of the hydrogen atoms in the —CH₂ unit carry an

group, especially an —NH₂ group.

Examples of reducing agents in which the element M forms part of a cyclic ring system include piperidine, and N-hydrocarbyl, especially N-alkyl, derivatives of piperidine.

Other reducing agents include triallylamine,

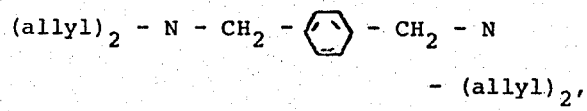

allyl thiourea, o-tolyl thiourea, soluble salts of aromatic sulphinic acids, for example S-benzyl iso-thiuronium p-toluene sulphinate, and sodium diethyl dithiophosphate, and amino acids, for example indol-3-acetic acid.

Suitably the concentration of the reducing agent may be in the ranges hereinbefore described in respect of the photosensitizer although concentrations outside these ranges may be used if desired. Preferably, the reducing agent is present in a concentration of from 1 to 5% by weight of the ethylenically unsaturated material in the photopolymerizable composition.

Where one or more of the groups R in the reducing agent

is aromatic then it is preferred to have a concentration of reducing agent in the photopolymerizable composition in the range 0.01 to 0.5% by weight of the ethylenically unsaturated material in the composition on account of the more rapid rates of polymerization which may be obtained when the reducing agent is present in this concentration range.

The photosensitizer and the reducing agent desirably should be soluble in the ethylenically unsaturated material at least to an extent sufficient to give the desired concentration therein. Although polymerization will proceed if the photosensitizer and reducing agent are not completely dissolved, it is much preferred that the photosensitizer and the reducing agent are together completely soluble in the ethylenically unsaturated material to the desired extent.

The method of mixing the photosensitizer and the reducing agent with the ethylenically unsaturated material may have a bearing on the success or otherwise of achieving the desired concentrations of photosensitizer and reducing agent therein. Thus, where the photosensitizer or reducing agent is not sufficiently soluble in the ethylenically unsaturated material, or where one or the other may be dissolved only with difficulty, we have found that dissolution may be assisted by addition to the ethylenically unsaturated material of a small amount of a diluent in which the photosensitizer or reducing agent is soluble and which is miscible with the ethylenically unsaturated material. Suitably, the photosensitizer or reducing agent may be introduced into the ethylenically unsaturated material in the form of a solution in such a diluent.

The photosensitizer and reducing agent may be dissolved in the same batch of a suitable diluent and then added to the ethylenically unsaturated material. Alternatively, the photosensitizer and reducing agent may be dissolved in different batches of the same or different diluents and added to the ethylenically unsaturated material. The method of addition, the diluent or diluents, and the amounts thereof to be used will readily be determined by a skilled man. In general the minimum amount of diluent(s) will be used.

In general, polymerization of the ethylenically unsaturated material proceeds readily at ambient temperature when the composition is irradiated with radiation having a wavelength which converts the photosensitizer to an excited state. However, the rate of polymerization often may be increased by effecting the polymerization at a temperature above room temperature.

The polymerizable ethylenically unsaturated material, which usually will be free-radically polymerizable, is suitably at least one monomer containing ethylenic unsaturation in a terminal group. For example, the ethylenically unsaturated material may be one or more monomers selected from vinyl monomers, allyl monomers and vinylidene monomers.

Suitable vinyl monomers which may be polymerized include, for example, vinyl esters, aromatic vinyl compounds and vinyl nitriles.

Vinyl esters suitable for use in the method of our invention include, for example, vinyl acetate and esters of acrylic acid having the structure $CH_2 = CH - COOR_7$, where $R_7$ is an alkyl, aryl, alkaryl, aralkyl or cycloalkyl group. For example, $R_7$ may be an alkyl group having from 1 to 20, and preferably from 1 to 10 carbon atoms. Particular vinyl esters which may be mentioned include, for example, methyl acrylate, ethyl acrylate, n- and isopropylacrylates and n-, iso- and tertiary butyl acrylates.

Other suitable vinyl esters include for example, esters of the formula $CH_2 = C(R_8)COOR_7$, where $R_8$ is methyl. In the ester of formula $CH_2 = C(R_8)COOR_7$, $R_7$ and $R_8$ may be the same or different. Particular vinyl esters which may be mentioned include, for example, methyl methyacrylate, ethyl methacrylate, n- and isopropylmethacrylate, and n-, iso- and tertiary butyl methacrylate. Suitable aromatic vinyl compounds include, for example styrene and derivatives thereof, e.g., $\alpha$-alkyl derivatives of styrene, e.g., $\alpha$-methyl styrene, and vinyl toluene.

Suitable vinyl nitriles include, for example, acrylonitrile and derivatives thereof, e.g., methacrylonitrile. Other suitable vinyl monomers include vinyl pyrollidone, and hydroxyalkyl acrylates and methacrylates, e.g., hydroxyethyl acrylate, hydroxypropylacrylate, hydroxyethyl methacrylate and hydroxypropylmethacrylate.

The ethylenically unsaturated material may include at least one ethylenically unsaturated polymer, suitably in combination with at least one ethylenically unsaturated monomer. For example, the ethylenically unsaturated polymer may be an ethylenically unsaturated polyester formed by condensation of at least one ethylenically unsaturated polycarboxylic acid or anhydride, optionally in combination with at least one saturated polycarboxylic acid or anhydride, with at least one polyol.

Where the photopolymerizable composition includes a mixture of an ethylenically unsaturated polyester and an ethylenically unsaturated monomer the polyester and monomer may be present in the composition in a proportion by weight of polyester:monomer of from 99:1 to 1:99, preferably from 90:10 to 10:90.

We have found that where the ethylenically unsaturated material in the photopolymerizable composition comprises a mixture of an ethylenically unsaturated polyester and an ethylenically unsaturated monomer then, particularly where the reducing agent is an amine, the acceleration in the rate of polymerization of the ethylenically unsaturated material which is obtained by including a given concentration of reducing agent in the composition is greater the lower is the acid value of the ethylenically unsaturated polyester in the composition.

The ethylenically unsaturated monomer may be, or may include, a polyfunctional monomer, polymerization of which will lead to the production of cross-linked materials. Suitable polyfunctional ethylenically unsaturated monomers include, for example, divinyl benzene, glycol dimethacrylate and a reaction product of a hydroxyalkyl acrylate or methacrylate with an isocyanate-ended adduct of a diol and a diisocyanate, for example, a reaction product of hydroxy ethyl methacrylate and an isocyanate-ended adduct of 4:4'-diphenyl methane diisocyanate and oxypropylated bisphenol-A.

Where the ethylenically unsaturated material is a solid then it may be convenient, in order to produce a liquid composition, to include a suitable diluent in the composition. The diluent should, of course, have little or no inhibiting effect on polymerization of the ethylenically unsaturated material in the composition.

The compositions of our invention are suitable for the production of shaped articles of polymeric materials, for example sheets, and are particularly suitable for use in the preparation of polymeric materials in the form of films and in particular paint films. Thus, as the compositions of our invention are substantially stable such that little or no polymerization of the ethylenically unsaturated material takes place in the absence of radiation they form can-stable compositions which may be formed into a film, e.g., a paint film, and then caused or allowed to polymerize by exposure to light, e.g., by exposing the film to natural light. When formed into a film and exposed to light the compositions rapidly polymerize.

The compositions of the invention, especially compositions which are to be used in the production of cross-linked materials, especially paint films, may contain pigments, which may be organic or inorganic.

Where the composition contains a pigment a photosensitizer should be chosen which is excited by radiation having a wavelength which is not absorbed to an excessive extent by the pigment present in the composition. Preferably, the pigment should be transparent to radiation at the wavelength which excites the photosensitizer. Where the pigment absorbs ultraviolet radiation but absorbs little or no radiation in the visible region of the spectrum those photosensitizers in the compositions of our invention which are excited by visible light, for example N,N,'-oxalyl indigo, are especially useful.

Other additives may be present in the photopolymerizable compositions, e.g., antioxidants and stabilizers.

The invention is now illustrated by the following examples in which all parts are expressed as parts by weight.

EXAMPLE 1

Experiment 1

0.01 part of N,N'-oxalyl indigo and 4 parts of dimethylaminoethyl methacrylate were dissolved in 100 parts of a mixture of 38% by weight styrene and 62% by weight of an unsaturated polyester resin available under the trade name Crystic 199. The resulting solution was charged at room temperature to a pyrex glass bottle which was then stoppered and irradiated with radiation from eight 20 watt blue-light fluorescent tubes (Atlas Chemicals) disposed in a circle around the bottle at a distance of about 3 inches from the bottle. After 2¼ minutes the solution had gelled to an extent such that it could no longer be poured. The period of time required to gel the solution just to the extent that it could no longer be poured was recorded as the gel point of the solution.

Experiments 2, 3 and 4

Three further experiments were carried out according to the above procedure except that 0.02, 0.05 and 0.005 part of N,N'-oxalyl indigo were used instead of 0.01 part. The gel points were 2 minutes, 1¾ minutes and 2½ minutes respectively.

Experiment 5

In a further experiment the procedure of Experiment 1 was repeated except that the 4 parts of dimethylaminoethyl methacrylate were omitted. The gel point had not been reached after 1 hour.

Experiments 6 and 7

Experiments 2 and 4 were repeated except that eight 20 watt black-light fluorescent tubes were used instead of the blue-light tubes. The gel point was 1¾ minutes in each experiment.

Experiment 8

Experiment 1 was repeated except that eight 20 watt green-light fluorescent tubes were used instead of the blue-light tubes. The gel point was 6¼ minutes.

Experiment 9

Experiment 3 was repeated except that 0.05 part of 3,3',5,5'-tetrachloro-N,N'-oxalyl indigo were employed instead of the N,N'-oxalyl indigo. The gel point was 5½ minutes.

EXAMPLE 2

0.02 part of N,N'-oxalyl indigo and 3 parts of dimethylaminoethyl methacrylate were dissolved in 100 parts of hydroxymethyl methacrylate and the solution was charged to a pyrex bottle and irradiated as described in Example 1 with light from eight 20-watt "Black Light Blue" tubes (Thorn Electric). The gel point was reached in 11.5 minutes.

For purposes of comparison the above procedure was repeated except that the dimethylaminoethyl methacrylate was excluded. The solution had not gelled after 30 minutes irradiation.

EXAMPLE 3

Example 2 was repeated using 'Blue Light' tubes (Thorn Electric) instead of 'Black Light' tubes. The gel point of the solution was 10 minutes.

In a comparison experiment in which the dimethylaminoethyl methacrylate was excluded, the solution had not gelled after irradiation for 1 hour.

EXAMPLE 4

0.02 part of 2,3-dibenzylnorborn-2-ene and 3 parts of dimethylaminoethyl methacrylate were dissolved in 100 parts of hydroxyethyl methacrylate and the solution was irradiated as in Example 2 using 'Black Light Blue' tubes. The gel point was 21 minutes.

In a further experiment in which the amount of the 2,3-dibenzoylnorborn-2-ene was reduced to 0.1 part, the gel point was 25 minutes.

EXAMPLE 5

The procedure of Example 1 was repeated except that instead of 2.1 part of N,N'-oxalyl indigo, there was employed 0.2 part of a 5:1 by weight mixture of

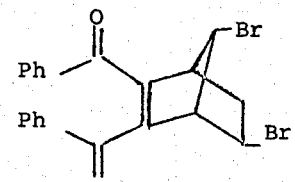

and

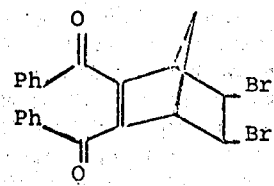

obtained by bromination of 2,3-dibenzoylnorborna-2,5-diene in chloroform.

The gel point was reached in 11 minutes.

What we claim is:

1. A photopolymerizable composition consisting essentially of at least one polymerizable ethylenically unsaturated material and a photosensitive catalyst comprising
   a. from 0.5 to 5% by weight based on the ethylenically unsaturated material of at least one photosensitizer having the structure

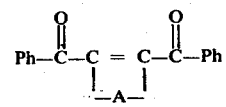

wherein Ph is phenyl, halogen-substituted phenyl, phenylene or halogen-substituted phenylene and A is a cyclic hydrocarbyl group, a halogen-substituted cyclic hydrocarbyl group or a group of the formula

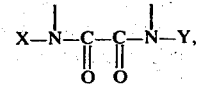

where X and Y each is hydrogen, a hydrocarbyl or a halogen-substituted hydrocarbyl group, and
   b. from 1 to 5% by weight based on the ethylenically unsaturated material of a reducing agent capable of reducing the photosensitizer when the photosensitizer is in an excited state.

2. A photopolymerizable composition as claimed in claim 1 in which the photosensitizer has the structure

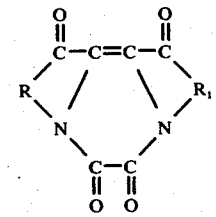

IV

3. A photopolymerizable composition as claimed in claim 2 in which in the photosensitizer each of the groups Ph is the phenylene group.

4. A photopolymerizable composition as claimed in claim 3 in which the photosensitizer is oxalyl indigo.

5. A photopolymerizable composition as claimed in claim 1 in which the reducing agent has the structure

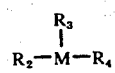

where M is an element of Group Vb of the Periodic Table of the Elements and the units $R_2$, $R_3$ and $R_4$, which may be the same or different, are hydrogen atoms, hydrocarbyl groups, substituted hydrocarbyl groups, or groups in which two units R together with the element M form a cyclic ring system, no more than two of the units R being hydrogen atoms and, where the element M is attached directly to an aromatic group R at least one of the other groups R has a

group attached to M.

6. A photopolymerizable composition as claimed in claim 5 in which in the reducing agent having the structure

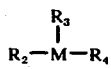

the groups $R_2$, $R_3$ and $R_4$ are free of aromatic groups attached directly to the element M.

7. A photopolymerizable composition as claimed in claim 5 in which in the reducing agent the element M is nitrogen.

8. A photopolymerizable composition as claimed in claim 7 in which the reducing agent is dimethylaminoethyl methacrylate.

9. A photopolymerizable composition as claimed in claim 1 in which the ethylenically unsaturated material comprises at least one monomer containing ethylenic unsaturation in a terminal group.

10. A photopolymerizable composition as claimed in claim 9 in which the composition includes at least one ethylenically unsaturated polyester.

11. A photopolymerizable composition as claimed in claim 9 in which the ethylenically unsaturated monomer is at least one of methyl methacrylate, styrene, vinyl pyrollidone, acrylonitrile and vinyl acetate.

12. A photopolymerizable composition as claimed in claim 9 in which the ethylenically unsaturated monomer is at least one of hydroxyethyl methacrylate and a reaction product of hydroxyethyl methacrylate and an isocyanate-ended adduct of 4:4'-diphenylmethane diisocyanate and oxypropylated bisphenol-A.

13. A photopolymerizable composition as claimed in claim 9 which includes at least one pigment.

14. A process for the preparation of a polymeric material which comprises irradiating a photopolymerizable composition as claimed in claim 1 with radiation having a wavelength which is capable of exciting the photosensitizer to an excited state.

15. A process as claimed in claim 14 in which the radiation has a wavelength in the range of 230 m$\mu$ to 600 m$\mu$.

16. A process as claimed in claim 15 in which the radiation is or includes visible light.

17. A polymeric material produced according to claim 14 which is in the form of a paint film.

18. A photopolymerizable composition as claimed in claim 1 in which X and Y are Ph.

* * * * *